(12) United States Patent
Payne et al.

(10) Patent No.: US 7,346,141 B2
(45) Date of Patent: Mar. 18, 2008

(54) APPARATUS AND METHOD FOR MOVING A FERROMAGNETIC ELEMENT

(75) Inventors: Ron Payne, Lynchburg, VA (US);
Christopher Plucker, Lynchburg, VA (US)

(73) Assignee: Areva NP Inc., Lynchburg, VA (US)

(*) Notice: Subject to any disclaimer, the term of this patent is extended or adjusted under 35 U.S.C. 154(b) by 177 days.

(21) Appl. No.: 11/209,902

(22) Filed: Aug. 23, 2005

(65) Prior Publication Data

US 2007/0237283 A1    Oct. 11, 2007

(51) Int. Cl.
*G21C 19/20* (2006.01)
(52) U.S. Cl. .............. 376/362; 376/431; 376/433; 376/434; 376/436
(58) Field of Classification Search .......... 310/103, 310/154.03, 154.11, 154.36, 154.37, 156.11, 310/164; 376/260, 261, 262, 258, 362, 431, 376/433, 434; 72/283, 478, 479
See application file for complete search history.

(56) References Cited

U.S. PATENT DOCUMENTS

| 2,803,761 | A | * | 8/1957 | Young | 310/14 |
| 4,161,112 | A | * | 7/1979 | Stump | 72/283 |
| 4,613,477 | A | * | 9/1986 | Dableh | 376/258 |
| 4,934,038 | A | * | 6/1990 | Caudill | 29/523 |

* cited by examiner

*Primary Examiner*—Ricardo J. Palabrica
(74) *Attorney, Agent, or Firm*—Vytas R. Matas (57) ABSTRACT

A device and technique for placing and moving a ferromagnetic element in an annulus between coaxially arranged cylindrical tubes. The device includes an electromagnetic ram moved along the interior of a cylindrical tube. The movable ferromagnetic element is magnetically coupled to the electromagnetic ram and moved by magnetic force to a location in the annulus defined by the tubes and magnetically coupled to the electromagnetic ram for movement in and removal from the annulus.

3 Claims, 6 Drawing Sheets

APPARATUS AND METHOD FOR MOVING A FERROMAGNETIC ELEMENT

FIELD OF THE INVENTION

This invention relates generally to an apparatus and method for positioning spacers that are located within and must be moved in an annulus defined by concentric cylindrical tubes. More specifically, the invention relates to an apparatus and method of positioning tube spacers during replacement of pressure tubes in calandria tubes used in Canada-Deuterium-Uranium ("CANDU") fluid cooled nuclear reactors.

BACKGROUND OF THE INVENTION

The invention is especially applicable to an apparatus and method for moving toroidal spacers in an annulus defined by coaxial concentric cylindrical tubes.

The apparatus uses a magnetic force to move a generally toroidal ferromagnetic pusher and a toroidal spacer into the annulus defined by coaxially aligned concentric cylindrical tubes and to move the spacer axially of such tubes after such spacer is in the annulus.

An apparatus and method for moving spacers located in an annulus defined by the pressure and calandria tubes in a CANDU reactor for the purpose of locating or repositioning the spacer is shown and described in detail in U.S. Pat. No. 4,633,477 issued Sep. 23, 1986 to Dableh ("the Dableh patent").

The Dableh patent contains a description of an issue existing in the repair of axially concentric closed tubes in CANDU reactors having a ferromagnetic garter spring spacer located in the annulus defined by the coaxial pressure and calandria tubes to maintain a constant spacing therebetween. The Dableh patent describes the issue and a method and apparatus for applying a magnetic force to such a spacer and causing movement of such spacer in an annulus located between the concentric cylindrical tubes as follows:

In a fluid-cooled nuclear reactor, such as a CANDU reactor, having a calandria comprising an array of cylindrical calandria tubes each surrounding a concentric cylindrical pressure tube extending therethrough. The pressure tubes being generally evenly spaced from the respective calandria tubes in which they are housed by annular spacers. The spacers often comprise coiled springs commonly called "garter springs". The spacers maintain the pressure and calandria tubes in a generally evenly spaced coaxial relationship to prevent the tubes from coming into contact with each other. This spacing helps to maintain a substantially even temperature gradient between the tubes and prevents local overheating and failure of the tubes due to such overheating.

In the installation or during operation of such a reactor, the spacers may be moved from the intended design positions with the result that the pressure tubes will not have the supports that are required to carry the loads that are encountered in operation of the reactor, and serious problems may arise from deflection of these tubes. For safe operation of such a reactor it is therefore advantageous to have a means for repositioning the spacers to their intended positions after installation or even after the reactor has been operating for some time. However, these spacers are located in an annulus between the pressure tubes and the calandria tubes and are not easily directly accessible by mechanical means.

The Dableh patent describes the issues and application of the present invention.

Another method and apparatus for using electromagnetic force to move spacers in an annulus of calandria tube and pressure tube is shown and described in related U.S. Pat. Nos. 4,867,940 and 4,909,980 entitled Electromagnetic Method (Apparatus) for Positioning Objects Located behind a Conductive Wall issued Sep. 19, 1989 and Mar. 20, 1990 to Matija Cenanovic ("the Cenanovic patents").

The Dableh and Cenanovic patents move ferromagnetic garter spring spacers by applying a magnetic force directly to the spacers and coupling the spacers to an electromagnet.

The present invention relates to an apparatus and method for performing a similar function on similar spacers as described above in the Dableh patent and Cenanovic patents. Specifically, the present invention provides a novel apparatus and method for positioning the tube spacers. This invention also uses electromagnetic forces but includes an innovative mechanism and technique for providing a ferromagnetic mechanical pusher to apply the force to move the spacers.

SUMMARY OF THE INVENTION

This invention relates to an apparatus and method for locating spacers in the annulus between co-axial cylindrical tubes.

In one potential application of the invention, the machine can be used for positioning (a) pressure tubes with respect to calandria tubes, and (b) the spacers between pressure tubes and calandria tubes in CANDU reactors.

In the use of this invention, the inner and outer cylindrical tubes are preferably constructed of a non-ferromagnetic material thereby permitting relatively unobstructed flow of a magnetic field through the tubes.

One aspect of the invention is based on the concept of accessing and moving spacers located in an annulus between and defined by coaxial concentric cylindrical tubes with a generally toroidal ferromagnetic pusher that is controlled by magnetic forces from a remote movable electromagnetic apparatus. Hereinafter the movable electromagnetic apparatus is referred to as a magnetic ram.

The magnetic ram comprises a conductive wire coil, with electrical connections to a source of electric current and current switching and regulating controls, and which is moved axially internally of a cylindrical tube by a push rod. A controlled electrical current is provided to the coil and the magnetic ram generates a magnetic force that acts on a segmented, radially expandable pusher and effectively couples the pusher to the ram for movement therewith. Normally, the segmented expandable pusher is held in a first smaller diameter condition by magnetic force from the electromagnetic ram or a garter spring or resilient O-ring surrounding the individual segments.

The magnetic coupling creates a force in the pusher that moves the pusher with the magnetic ram. In operation, a spacer is placed axially downstream of the pusher for movement therewith. The movement of the electrically actuated magnetic ram moves the pusher and spacer axially to a desired location in the annulus defined by inner and outer coaxial cylindrical tubes.

The initial movement of the pusher and spacer is from a first stored position, where the segmented pusher and spacer are resiliently biased onto the outer surface of the push rod along axially extending fingers of a collet and mandrel.

The fingers of the collet and mandrel are adapted to engage an open end of the inner cylindrical tube and be expanded radially outwardly to form a bridge comprising a frusto-conical surface between a smaller diameter of the outer surface of the push rod and a larger diameter of the outer surface of the inner cylindrical tube.

The collet and mandrel can be used to hold the inner cylindrical tube against axial movement, and can, with a force provided by a second push rod, move the inner tube to a desired axial position with respect to the outer tube.

Additionally, the collet and mandrel provides a bridge between the outer diameter of the push rod and the outer diameter of the inner tube. The fingers of the collet and mandrel expand the pusher and spacer radially as the pusher moves along the collet and mandrel toward the inner cylindrical tube such that the inner diameters of the pusher and spacer become larger than the outer diameter of the inner cylindrical tube.

Accordingly, as the pusher and spacer move beyond the collet and mandrel, the pusher and spacer enter the annulus between the inner and outer cylindrical tubes. Thereafter, the pusher and spacer can be moved by magnetic force axially along the annulus between the outer and inner cylindrical tubes. When located in the annulus, the pusher can be used to move the spacer axially by pushing the spacer to any desired position in the annulus.

Radially inwardly extending shoulders on the collet and mandrel engage the end of the inner cylindrical tube. Upon engagement with the inner cylindrical tube, fingers on the collet and mandrel are moved radially outwardly until the outer diameter of the collet and mandrel at the end engaging the inner cylindrical tube is equal to or slightly larger than the outer diameter of the inner cylindrical tube. It is in this condition that the collet and mandrel provides a frusto-conical bridge between a smaller outer diameter of the push rod and a larger outer diameter of the inner cylindrical tube to expand the spacer and pusher causing the spacer and pusher to enter the annulus between the inner and outer tubes.

A toroidal spacer is moved by a pick up finger from a storage position on the outer diameter of the push rod and moved axially along the push rod and collet and mandrel until it is located axially upstream of and adjacent the pusher. Activation of the electromagnetic coil with electrical current generates a magnetic force on the pusher coupling the pusher to the magnetic ram and movement of magnetic ram causes the pusher and toroidal spacer to move onto the outer surface of the inner cylindrical tube and into the annulus defined by the outer surface of the inner cylindrical tube and the internal surface of the outer cylindrical tube as described above.

The electromagnetic ram is moved by a mechanically driven push rod along the interior of the pressure tube to move the pusher and spacer.

By providing a electric current through the coil and controlling the position of the coil relative to the pusher and the magnitude and other electrical aspects of the current flow to the coil, the magnetic ram exerts an magnetic coupling force on the pusher sufficient to overcome static friction between the pusher and spacer and the tubes and cause the spacer to be moved to a new axial position in the annulus.

The pusher is removed from the annulus defined by the inner and outer cylindrical tubes by reversing the operation and direction of movement of the push rod and magnetic ram and controlling the electric current supplied to the electromagnetic coil.

The invention provides for use of the collet and mandrel as an expandable collet for engaging the inner cylindrical tube. With the collet in engagement with the inner cylindrical tube, the push rod can be used to move the inner cylindrical tube axially to a desired position with respect to the outer cylindrical tube or other reference point.

Other objects and features of the invention will be described in connection with the following description of the preferred embodiment.

BRIEF DESCRIPTION OF THE DRAWINGS

To more fully describe the invention, an apparatus and method for practicing the invention will be described in detail, by way of example, with reference to the accompanying drawing, in which.

DESCRIPTION OF THE PREFERRED EMBODIMENT

Figure 1:
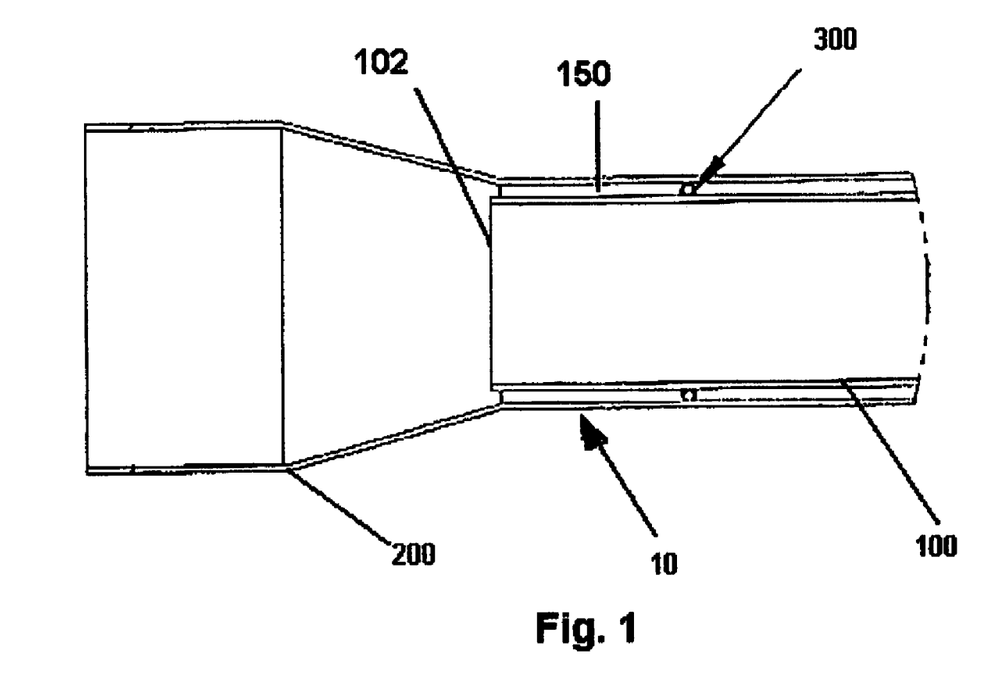
FIG. 1 illustrates a partial longitudinal sectional perspective view of inner and outer coaxially-aligned cylindrical tubes and a cross-sectional view of a spacer located in the annulus defined by the inner and outer tubes.

Referring to FIG. 1, an assembly 10 comprising an inner cylindrical tube 100 and coaxial outer cylindrical tube 200 are maintained in a radially spaced relationship by a spacer 300 in the annulus 150 defined by the inner and outer cylindrical tubes 100 and 200. As discussed earlier in the Background of the Invention, this coaxial arrangement of cylindrical tubes is found in calandria arrays found in CANDU nuclear reactors.

In CANDU reactor tubes, the spacers 300 are distributed along the length of tubes 100 and 200 at appropriate locations as needed to maintain a substantially even separation of the tubes.

The inner and outer tubes are preferably constructed of a non-ferromagnetic material.

Figure 2:
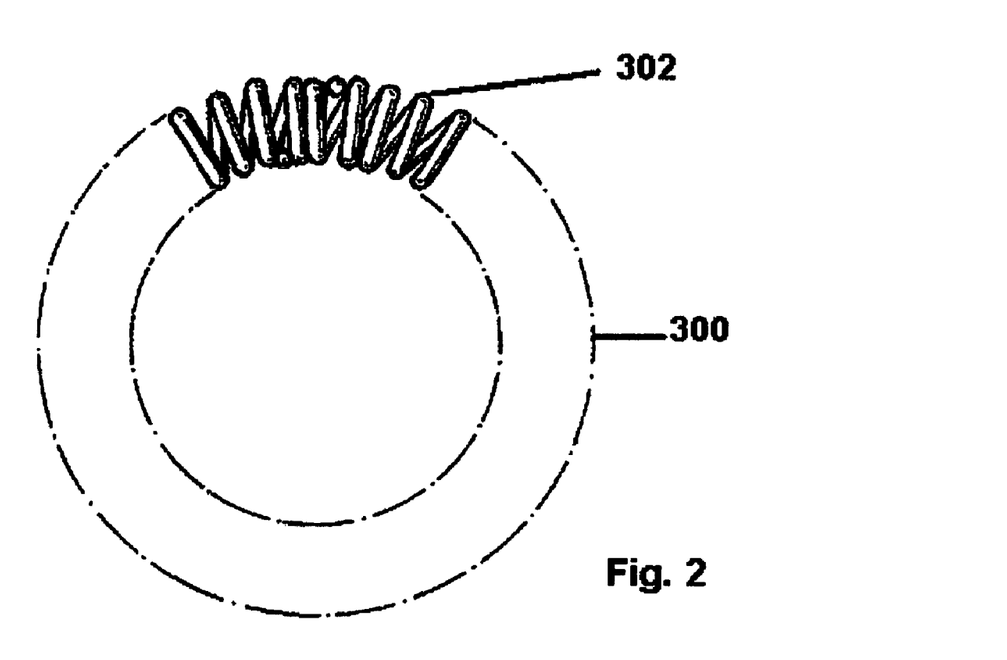
FIG. 2 is a partial three dimensional plan view of a spacer shown in section in FIG. 1.

The spacer 300 as shown in FIG. 2, is commonly referred to as a "garter spring" and consists of a wire 302 wound in circles about a first axis to form a coil spring and connected end to end into a larger circle forming a toroidal shape. Satisfactory spacers may have various other physical forms but the toroidal garter spring form shown in FIG. 2 has desirable strength and weight characteristics and is commonly available and preferred.

In use, the spacers 300 are located in an annulus 150 defined by inner and outer cylindrical tubes 100 and 200 and are not easily directly accessible and are difficult to place or relocate by direct acting mechanical means.

Figure 3:
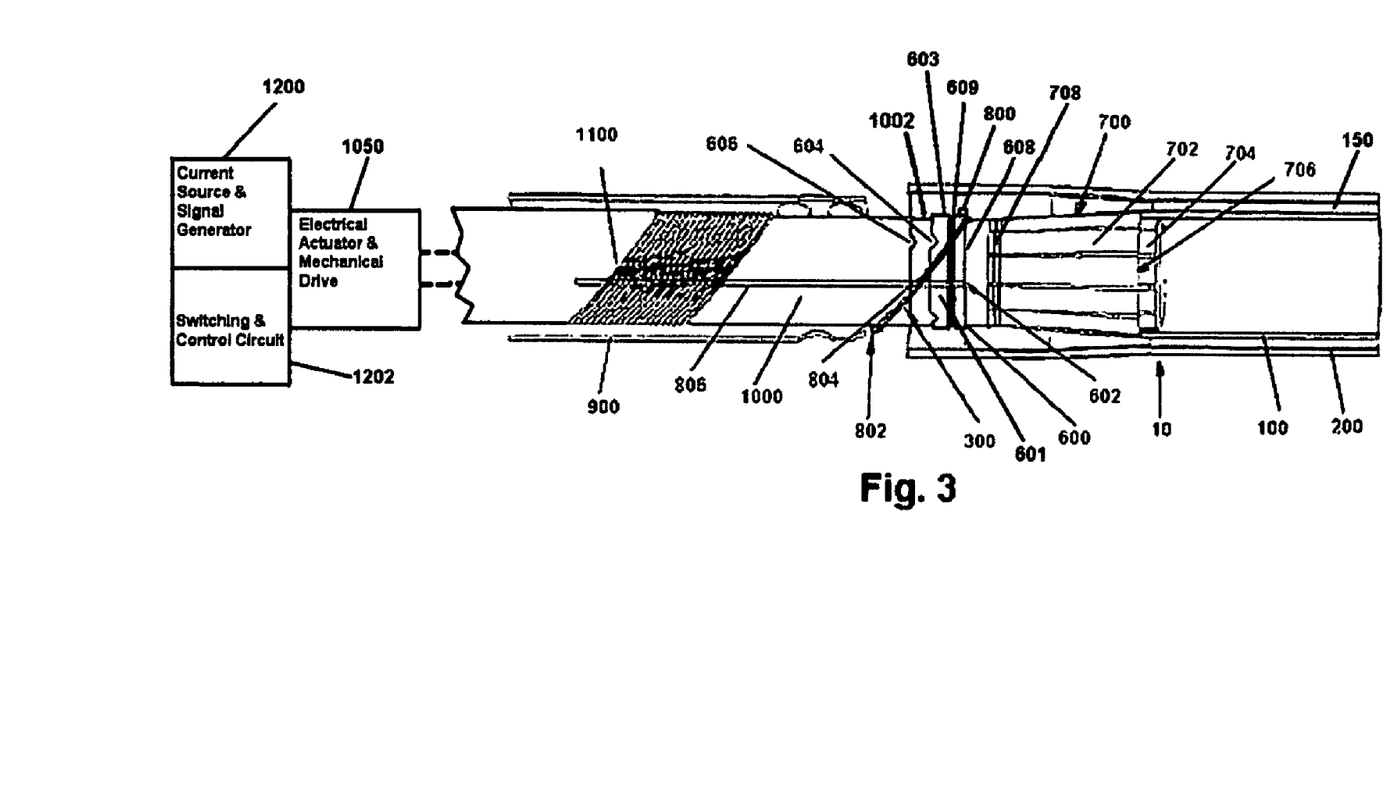
FIG. 3 is a partial sectional perspective view showing the apparatus of the present invention in a first operating position.
Figure 4:
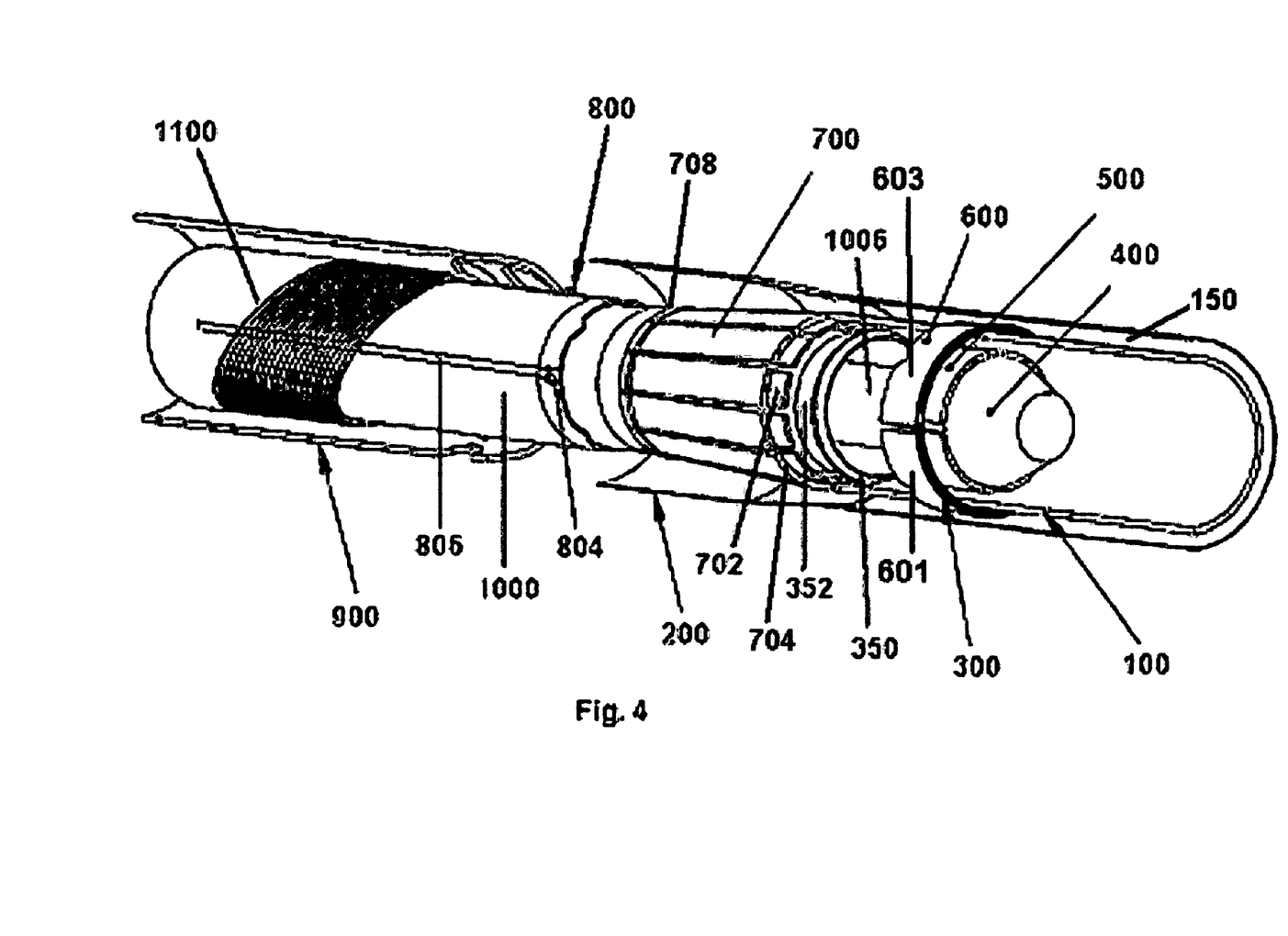
FIG. 4 is a partial sectional perspective view showing the apparatus of the present invention in a second operating position.
Figure 5:
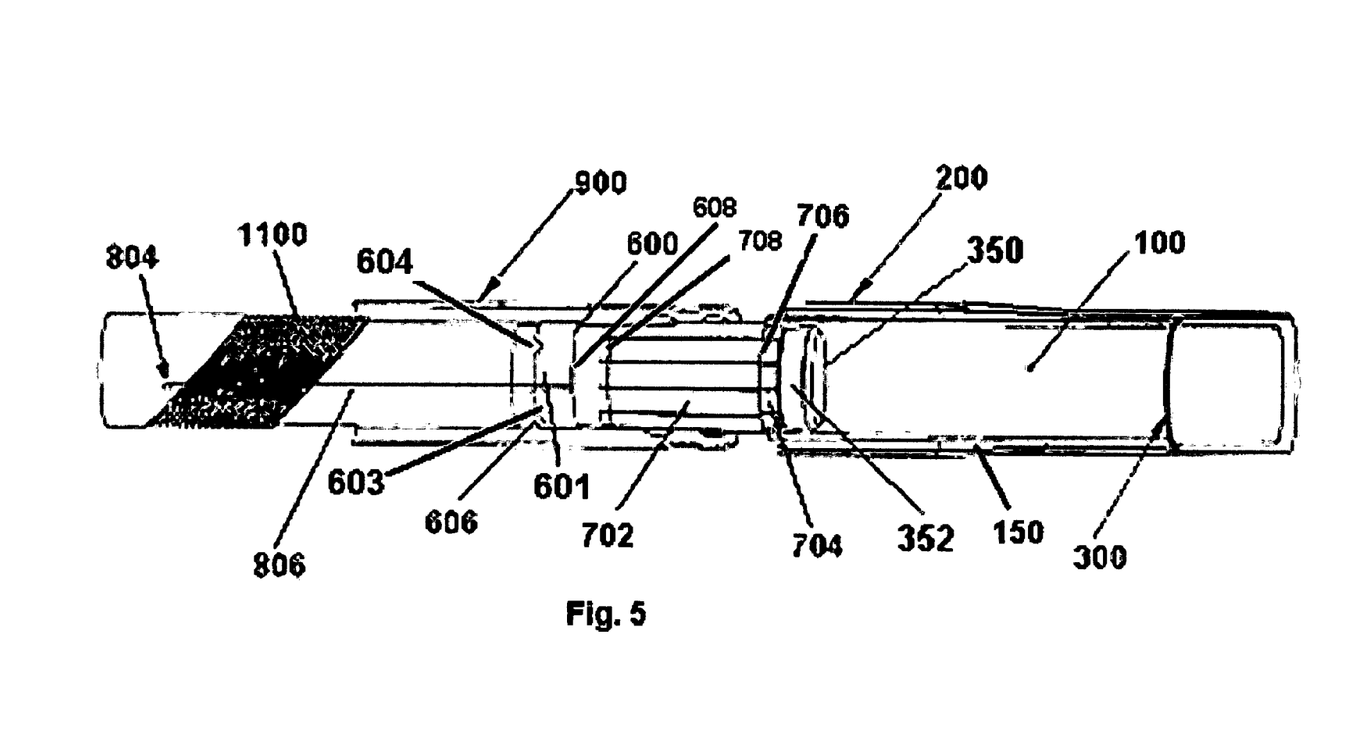
FIG. 5 is a partial sectional perspective view showing the apparatus of the present invention in a third operating position.

FIGS. 3, 4 and 5 show the apparatus and the principles of the method of this invention.

As shown in FIG. 3, the apparatus includes a source of electrical current and signal generator 1200, an electrical current switching and control circuit 1202, and a reversible electric actuator and mechanical drive 1050. The source of electrical current and signal generator 1200, switching and control circuit 1202 and reversible electric actuator and mechanical drive 1050 also exist in the apparatus of FIGS. 4 & 5, but are shown and described only in respect of FIG. 3.

The apparatus of FIGS. 3, 4 and 5 also includes first and second cylindrical push rods 1000 and 1006, each operatively associated with the electrical actuator and mechanical drive 1050. The push rods 1000, 1006 also are operatively connected to a segmented toroidal pusher 600, and a combination collet and mandrel 700.

In FIG. 3, the first push rod 1000 is shown in an operating position within a cylindrical tube 900 to show that the invention is capable of operating in environments with restricted physical access, with the collet and mandrel 700 partially within the outer cylindrical tube 200 and radial shoulders 706 of collet and mandrel 700 in contact with an end 102 of the inner cylindrical tube 100.

The electric actuator and mechanical drive 1050 is operatively associated with the push rods 1000 and 1006 and is adapted to provide power-assisted bi-directional axial movement thereto. The electrical actuator and mechanical drive 1050 may be a rotary electric motor associated with a ball-nut drive or other suitable linear power transmission device such as a hydraulic circuit including a pump and ram.

The push rod 1000 carries a number of spacers 300 at a storage location designated as 1100.

The spacers 300 at storage location 1100 overlie at least one axial slot 806 in the push rod 1000.

Axially movable fingers 800, 804 are provided and guided by the slot 806 and similar axial slots (not shown) in the push rod 1000 and extend above the outer surface of the push rod 1000 for selectively moving a spacer from the storage location 1100 axially along the push rod 1000 to a working location as described hereinafter. The fingers 800, 804 move under the influence of a hydraulic or electric actuator (not shown) which is also supplied with controlled electric current from the source of electric current (1200) and switching and control circuit (1202).

The pusher 600 can be comprised of three to five segments, 601, 603, etc. When inoperative the segments 601, 603 are maintained in a minimum diameter condition substantially in contact with the push rod 1000 by magnetic force from the magnetic ram 400 or by an o-ring or garter spring 609. The segments 601, 603 of the expandable toroidal pusher 600, when inoperative, are maintained in a predetermined radial position with respect to the push rod 1000 by a generally V-shaped centering cam 606 on the push rod 1000 and mating V-shaped grooves 604 on the pusher 600.

The radial positioning of the pusher 600 with respect to the push rod 1000 maintains a gap 602 between segments 601, 603 of the pusher 600. The gap 602 is in alignment with the finger slot 806 and allows the axially movable fingers 804 to move through the gap 602 and place a spacer 300 that has been transported from the storage location 1100 on the end 608 of the pusher 600. The minimum diameter condition of the pusher 600 permits the movable fingers 804 to convey the spacer 300 from the storage location 1100 to an operative position at the end 608 of the pusher 600.

The collet and mandrel 700 comprises a plurality of similar axially extending fingers 702 arranged circumferentially on the first push rod 1000. The fingers 702 are fixedly connected to the push rod 1000 at one end 708. Each collet and mandrel finger 702 is radiused in a direction circumferentially of the first push rod 1000 to provide a generally circular, substantially frusto-conical surface area to support the spacers 300 and segments 601, 603 of the pusher 600 during movement across the collet and mandrel 700 to the outer surface of the inner cylindrical tube 100.

Each collet and mandrel finger 702 also includes a radially inwardly extending shoulder 706 and an axially extending tab 704. The radial shoulders 706 have a length that is substantially the same as the wall thickness of the inner cylindrical tube 100. The fingers 702 are normally biased radially inwardly to provide the collet and mandrel 700 with a first minimum outer diameter. When the fingers 702 are in the minimum diameter condition, the axially extending tabs 704 have a diameter that is less than the diameter of inner surface of the inner cylindrical tube 100.

FIG. 4 shows the apparatus of FIG. 3 in a second operating condition where a magnetic ram 400 including a coil 500 of conductive wire (shown as a section of a coil in FIG. 6) is visible. The axis of the magnetic ram 400 is oriented coaxially with the first and second push rods 1000, 1006 and in operation is moved on and along the common axis of the inner cylindrical tube 100 and outer cylindrical tube 200.

As is shown in FIG. 4, the present invention provides for applying a force directly to the spacers 300 using the segments 601, 603 of the ferromagnetic toroidal pusher 600 that is moved by magnetic force from a magnetic ram 400.

The magnetic ram 400 is moved axially within the inner tube 100 by the push rod 1006. The magnetic ram 400 may be a coil, or include a coil, that is magnetized by an electric current, i.e., an electromagnet.

The push rod 1006 may have any length that is required to reach the opposite end of the inner and outer cylindrical tubes 100 and 200. Such tubes may have a length of up to 30 feet or more.

In FIG. 4, the magnetic ram 400 has been moved axially from an initial position located radially inward of the pusher 600 in FIG. 4 to an extended position within the inner cylindrical tube 100.

Also seen in FIG. 4 is an axially movable, radially expandable collet 350. The axial and radial movement of the collet 350 is powered by an electrical or hydraulic actuator (not shown) and mounted on a third pushrod (not shown) for bi-directional axial movement with respect to the first and second push rods 1000 and 1006. The collet 350 includes a frusto-conical surface 352.

The collet 350 is radially expandable to engage the internal surface of the inner cylindrical tube 100. The collet 350 engages the axially extending collet and mandrel tabs 702 for moving the tabs 702 radially outwardly into engagement with the internal surface of the inner cylindrical tube 100.

In FIG. 4, the pusher 600 has been moved axially by magnetic force from the magnetic ram 400 from the initial position shown in FIG. 3 along the bridge provided by collet and mandrel 700 and into the annulus 150. Also, as seen in FIG. 4, the pusher 600 has moved a spacer 300 into the annulus 150.

FIG. 5 shows the apparatus of the present invention in a third operating condition. In FIG. 5, the first push rod 1000, second push rod 1006 and magnetic ram 400 have been withdrawn from the extended position shown in FIG. 4 to the initial parked position shown in FIG. 3. Accordingly, the magnetic ram 400 has been withdrawn to within the collet and mandrel 700 and is not visible in FIG. 5. The pusher 600 was moved during retraction of the magnetic ram 400 to the initial position on the first push rod 1000 and the segments 601, 603 thereof have returned to an original minimum radial dimension by garter spring or O-ring 609.

In FIG. 5 the expandable collet 350 is shown in an axially extended position.

Figure 6:
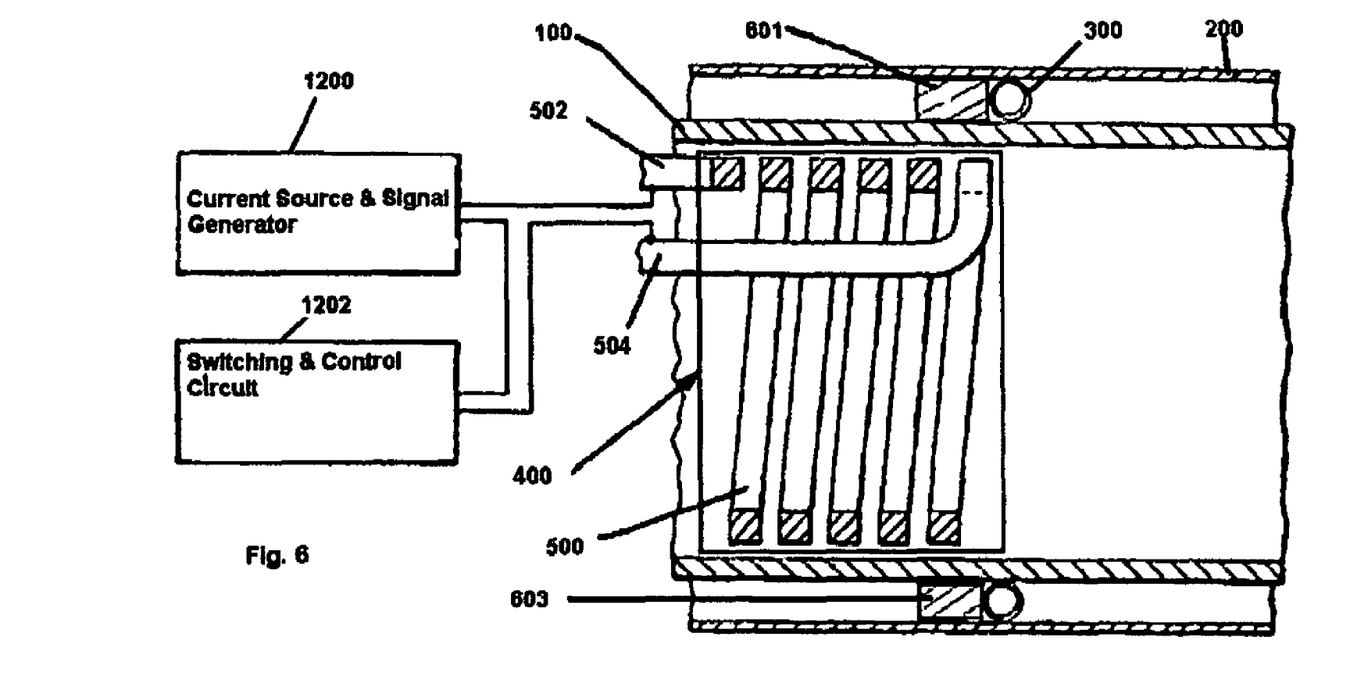
FIG. 6 is a partial schematic, partial sectional view showing a cross-section of a coil of conductive wire for the magnetic ram with blackbox diagrams representing a source of electric current and switching and regulating controls therefor.

FIG. 6 shows a coil 500 for the electromagnetic ram 400 and black box electrical current source and signal generator 1200 and control circuit 1202 for creating and controlling an a magnetic field from the coil 500. The coil comprises a winding of conductive wire 500 having leads 502 and 504 from the current source and signal generator 1200 and the switching and control circuit 1202. The coil 500 is the primary operating element of the magnetic ram 400. The switching and control circuit 1202 is capable of controlling the current level, current flow and switching the current off and on as required for proper operation of the apparatus and method of this invention.

FIG. 6 also shows a sectional view of the spacer 300 and segments 601, 603 of the pusher 600 in the annulus 150 defined by the inner and outer cylindrical tubes 100, 200.

Description of Operation

FIG. 3 shows the apparatus of the present invention where the first push rod 1000 and collet and mandrel 700 are axially aligned with, but spaced from, the inner cylindrical tube 100.

The spring loader fingers 800, 802, 804 are moved axially along their respective axial slots 806 to the storage area 1100 to get a spacer 300.

The selected spacer 300 is moved by the spring loader fingers 800, 802, 804 from the storage area 1100 over the segments 601, 603 of the pusher 600 to a position axially adjacent the leading edge 608 of the pusher 600 and the spring loader fingers 800, 802, 804 are retracted along the slots 806 to a position to get another spacer 300 when appropriate.

The first push rod 1000 is moved axially causing movement of the collet and mandrel 700 toward the coaxial tube assembly 10. The collet and mandrel fingers are resiliently biased radially inwardly to a first minimum diameter. At the minimum diameter, the axially extending tabs 704 have an outer diameter which is smaller than the inner diameter of the inner cylindrical tube 100. When the collet and mandrel tabs 704 enter the inner cylindrical tube 100 and the collet and mandrel shoulders 706 engage the end of the inner cylindrical tube 100, movement of the push rod 1000 is stopped.

With the shoulders 706 in contact with the end 102 of inner cylindrical tube 100, the primary collet 350 is expanded against the resilience of the collet and mandrel fingers 702 to move the collet and mandrel tabs 704 into engagement with the interior surface of the inner cylindrical tube 100.

In this condition, the push rod 1000 and collet 350 holds the inner cylindrical tube 100 against axial movement.

The radial shoulders 706 have a radial dimension which is at least equal to the wall thickness of the inner cylindrical tube 100. Hence, the expansion of of the mandrel tabs 704 into engagement with the inner surface of the inner cylindrical tube 100 causes the collet and mandrel fingers 702 into a slightly frusto-conical surface forming a bridge between the outer diameter of the push rod 1000 and the outer diameter of the inner cylindrical tube 100.

The magnetic ram 400 starts from an initial retracted position located radially below and axially aligned with the pusher 600. A current is passed through the coil 500, thereby producing a magnetic field and inducing an E.M.F. in the segments 601, 603 of the generally toroidal pusher 600 which is used to move the pusher 600 and spacer 300 axially of the push rod 1000.

The magnetic ram 400 is moved axially toward the inner cylindrical tube 100 by a second push rod 1006. The magnetic field from the coil 500 causes the pusher 600 to move axially with the magnetic ram 400. The magnetic ram 400 is advanced across the collet and mandrel 700. The segments 601, 603 of pusher 600 are moved along and expanded radially by the frusto-conical bridge provided by the collet and mandrel fingers 702.

Continued movement of the magnetic ram 400 causes the spacer 300 and pusher 600 to enter the annulus 150 defined by the inner and outer cylindrical tubes 100, 200. The push rod 1006 is used to move the magnetic ram 400 to the location where a spacer 300 is appropriate. When the proper location for placement of a spacer 600 is reached, the push rod 1006 and magnetic ram 400 are retracted moving the pusher 600 back to its initial position on the push rod 1006 leaving the spacer 300 at the proper location.

The above sequence of operations is repeated until all necessary spacers 600 have been positioned in the annulus 150.

The primary collet 350 can be expanded to engage the inner surface of the inner cylindrical tube 100 and the push rod 1000 can be used to move the inner cylindrical tube 100 axially with respect to the outer cylindrical tube 200 if required.

The apparatus relies upon a source of electrical current and signal generator 1200, electrical switching and regulating controls 1202, and an electric actuator and mechanical drive 1050 for providing bi-directional movement and control over an axially movable push rods 1000, 1006.

The invention includes a generally cylindrical magnetic ram 400 including a coil 500 electrically connected to the source of electrical current and signal generator 1200, an electrical actuator and drive 1050, a first and second push rod 1000, 1006 associated with the electrical actuator and drive 1050 and adapted for bi-directional axial movement, switching and regulating controls 1202 for switching and regulating the flow of electric current associated with the source of electrical current and signal generator 1200 to the coil 500 of magnetic ram 400, and operatively connected to the electrical actuator and drive 1050 for moving the push rod 1006 and magnetic ram 400 and coil 500 along the axis and interiorly of said inner cylindrical tube 100, a radially expandable frusto-conical collet and mandrel 700 having one end fixed to the push rod 1000 and located on the push rod 1000 radially outwardly of the magnetic ram 400 and electromagnetic coil 500 and including a radial shoulder 702 and axially extending tabs 704 adapted to engage an end 102 of the inner cylindrical tube 100, an axially movable, a radially expandable toroidal collet 350 mounted on a third axially movable push rod (not shown) and normally located radially inwardly from the axially extending collet and mandrel tabs 704 for holding the axial tabs 704 in engagement with the inner cylindrical tube 100, and a segmented, generally toroidal, radially expandable annular pusher 600 surrounding the push rod 1000 and normally located axially adjacent the fixed end 708 of the collet and mandrel 700 and movable under the influence of a magnetic field generated by the coil 500 along the collet and mandrel 700 toward the radial shoulder 704 and into an annulus 150 between the inner and outer cylindrical tubes 100, 200 and thereafter movable under the influence of a magnetic field from coil 500 moving the toroidal spacer 300 to a selected position in the annulus 150.

The method of this invention comprises using the above described apparatus using axially movable spring loader fingers 800, 802, 804 for moving a garter spring spacer 300 from a storage location 1100 on the push rod 1000 to a working position adjacent the segments 601, 603 of the pusher 600, actuating the switching and regulating controls 1202 and the electrical actuator and mechanical drive 1050, moving the push rod 1000 axially of the inner cylindrical tube 100 until the radial shoulders 706 on the collet and mandrel fingers 702 engage the end 102 of the inner cylindrical tube 100, expanding the collet and mandrel fingers 702 radially until the largest outer diameter of the collet and mandrel 700 is equal to or slightly greater than the outside diameter of the inner cylindrical tube 100, providing an electrical current to an electromagnetic coil 500, using a second push rod 1006 associated with the electrical actuator and mechanical drive 1050 to move the magnetic ram 400 and coil 500 along an axial path that is located radially inwardly of the expandable collet and mandrel 700 thereby moving the pusher 600 and spacer 300 into the annulus 150 defined by the inner and outer cylindrical tubes 100 and 200.

The method further comprises expanding the collet 350 into engagement with the internal surface of the inner cylindrical tube 100 and moving push-rod 1000 to move the inner cylindrical tube 100 axially with respect to the outer cylindrical tube 200.

Accordingly, the invention provides, for use with a mechanism having coaxial inner and outer cylindrical tubes, an apparatus and method of positioning (a) the inner cylindrical tube with respect to the outer cylindrical tube, and (b) moving a spacer within an annulus from an initial to a second axial position in such annulus for maintaining a generally even spacing between the tubes.

We claim:

1. Apparatus for placing and moving a spacer (300) into and along an annulus (150) defined by inner and outer coaxial cylindrical tubes (100, 200), said apparatus comprising:

a first push rod (1000);

a radially expandable generally toroidal pusher (600) surrounding and located at a first axial position on said push rod (1000);

a collet and mandrel (700) operatively associated with the push rod (1000) axially adjacent the pusher (600) for engaging an end of said inner cylindrical tube (100) and providing a generally frusto-conical surface from the outer diameter of the push rod (1000) to the outer diameter of the inner cylindrical tube (100);

a second push rod (1006) supported for axial movement by said push rod (100);

a magnetic ram operatively associated with the second push rod (1006) for movement therewith from a first position located radially inwardly of the pusher (600) to a second position located within the inner cylindrical tube (100) for creating a magnetic coupling with the pusher (600) and moving the pusher from said first location on the push rod (1000) into the annulus (150); and wherein the pusher (600) comprises a plurality of arcuate ferromagnetic segments (601, 603) forming a generally toroidal, radially expandable ferromagnetic ring surrounding the push rod (1000) and normally located axially adjacent the fixed end (708) of the collet and mandrel (700) movable under the influence of a magnetic field from the electromagnetic coil (500) along the collet and mandrel (700) toward a radial shoulder (706) on a collet and mandrel finger (702) and into the annulus (150) between the inner and outer cylindrical tubes (100, 200) and thereafter movable under the influence of a magnetic field from the electromagnetic coil (500) to position a toroidal spacer (600) in said annular space.

2. Apparatus as defined in claim 1 further comprising:

a source of electrical current (1200);

an electric actuator and drive (1050) electrically connected to the source of electric current (1200);

said magnetic ram (400) including a coil (500) electrically connected to the source of current (1200) for generating a magnetic field; and controls for switching and regulating the flow of electric current (1200) associated with the source of electrical current (1200) and electrically connected to the electric actuator and drive (1050) and the coil (500).

3. Apparatus as defined in claim 2 further comprising:

an axially movable, radially expandable collet (350) mounted on the push rod (1000) and normally located radially inwardly of the collet and mandrel (700) for expanding the collet and mandrel (700) into engagement with the inner cylindrical tube (100).

* * * * *